(12) United States Patent
Oberman et al.

(10) Patent No.: US 11,379,772 B2
(45) Date of Patent: Jul. 5, 2022

(54) SYSTEMS AND METHODS FOR ANALYZING COMPUTER INPUT TO PROVIDE SUGGESTED NEXT ACTION FOR AUTOMATION

(71) Applicant: NICE LTD., Ra'anana (IL)

(72) Inventors: Eitan Oberman, Rishon Lezion (IL); Adi Levinshtein, Zur Izhak (IL); Eran Roseberg, Hogla (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/984,938

(22) Filed: Aug. 4, 2020

(65) Prior Publication Data
US 2022/0044168 A1    Feb. 10, 2022

(51) Int. Cl.
*G06Q 10/00* (2012.01)
*G06Q 10/06* (2012.01)
*G06Q 10/10* (2012.01)

(52) U.S. Cl.
CPC ... *G06Q 10/0633* (2013.01); *G06Q 10/06316* (2013.01); *G06Q 10/10* (2013.01)

(58) Field of Classification Search
CPC ............... G06Q 10/0633; G06Q 10/10; G06Q 10/06316
See application file for complete search history.

(56) References Cited

U.S. PATENT DOCUMENTS

| | | | |
|---|---|---|---|
| 2017/0277625 A1* | 9/2017 | Shtuchkin | G06F 11/3688 |
| 2019/0205792 A1* | 7/2019 | Huang | G06N 20/00 |
| 2020/0050983 A1* | 2/2020 | Balasu | G06F 11/3423 |
| 2020/0206920 A1* | 7/2020 | Ma | G06K 9/6223 |
| 2020/0219033 A1 | 7/2020 | Smutko et al. | |
| 2020/0401430 A1* | 12/2020 | Berg | G06V 30/153 |
| 2021/0086354 A1* | 3/2021 | Berg | G05B 19/41885 |
| 2021/0110345 A1* | 4/2021 | Iyer | G06Q 10/0633 |
| 2021/0150137 A1* | 5/2021 | Chittari | G06F 3/04847 |
| 2021/0158256 A1* | 5/2021 | Negulescu | G06Q 30/01 |
| 2021/0232372 A1* | 7/2021 | Da Silva Baptista Russo | G06F 8/38 |

OTHER PUBLICATIONS

Santos, F., Pereira, R., & José, B. V. (2020). Toward robotic process automation implementation: An end-to-end perspective. Business Process Management Journal, 26(2), 405-420. (Year: 2020).*

(Continued)

*Primary Examiner* — William S Brockington, III
(74) *Attorney, Agent, or Firm* — Pearl Cohen Zedek Latzer Baratz LLP

(57) ABSTRACT

A system and method may determine, e.g. for suggestion to an automation designer, a next action in an automation sequence of actions being created. The automation sequence may include actions executed by a computer system which substitute for actions taken by a user operating a computer system. A sequence of actions may be received, a database of action sequences may be searched for a set of action sequences corresponding to the sequence of actions, and the next action may be presented or determined as being the for example a subsequent new action immediately after the last action matching any action from the received sequence of actions in an action sequence in the set of action sequences.

17 Claims, 7 Drawing Sheets

(56) References Cited

OTHER PUBLICATIONS

Fournier-Viger, Philippe, "A Survey of Sequential Pattern Mining", Data Science and Pattern Recognition, vol. 1, No. 1, Feb. 2017.
Fournier-Viger, Philippe, et al., "VGEN: fast vertical mining of sequential generator patterns," The International Conference on Data Warehousing and Knowledge Discovery, pp. 476-488, 2014.
Yi Shengwei, An effective algorithm for mining sequential generators Procedia Engineering 15 (2011).
https://www.automationanywhere.com/home, printed on Jan. 25, 2021.
www.celonis.com/homepage, printed on Jan. 25, 2021.
https://www.fortressiq.com/, printed on Jan. 25, 2021.
https://www.kryonsystems.com/process-discovery/, printed on Jan. 26, 2021.
https://www.minit.io/use-cases/robotic-process-automationare, printed on Jan. 25, 2021.
https://processgold.com/company-news/new-website/, printed on Jan. 25, 2021.
https://www.promtools.org/doku.php, printed on Jan. 25, 2021.
https://www.abbyy.com/timeline/, printed on Jan. 25, 2021.
https://www.uipath.com/automation/enterprise, printed on Jan. 25, 2021.

* cited by examiner

SYSTEMS AND METHODS FOR ANALYZING COMPUTER INPUT TO PROVIDE SUGGESTED NEXT ACTION FOR AUTOMATION

FIELD OF THE INVENTION

The present invention relates generally to analysis of computer usage and development of automation, in particular to analysis of computer usage in order to provide a suggestion for a next user action or input in an automation sequence.

BACKGROUND OF THE INVENTION

Organizations such as call centers, or other businesses, may want to identify for users, e.g. company employees or agents, the best next action or input for a business analyst of data engineer to add to an automation sequence for an automation process. The automation sequence may be used by an end-user to execute when working with computer applications. The automation sequence may be used to produce Robotic process automation ("RPA") robots or bots, software tools which may perform an automation by repeating tasks directly in the graphical user interface (GUI), e.g. inputting actions to a GUI. The sequence of actions (e.g. click on button X, input NAME in field Y) may be input sequentially and automatically, to GUI elements of a computer terminal, substituting for human input.

Building successful automation processes requires a deep understanding by a human of what should be automated and knowing what should be the sequence of steps to ensure the automation runs successfully. The skill level required of the business analyst of data engineer creating the automation is very high, and the process itself can be very time consuming. Skilled automation creators will be able to resolve these issues manually, but this takes times and such a process is prone to mistakes.

SUMMARY

A system and method may determine, e.g. for suggestion to an automation designer, a next action in an automation sequence of actions being created. The automation sequence may include actions executed by a computer system which substitute for actions taken by a user operating a computer system. A sequence of actions may be received, a database of action sequences may be searched for a set of action sequences corresponding to the sequence of actions to produce a search result, and the next action may be presented or determined as being the last action in an action sequence in the set of action sequences.

A system and method may help users to understand what actions to add to an automation sequence and automatically generate part of the automation sequence, substituting for manual development. Conventional automation creation systems may not take into account conditions such as the existence of controls, fields, or other on-screen objects required for the automation to operate. In the prior art, the only solution to these problems is human experience and judgement.

In some embodiments, robust actions may be suggested to a user which cause an automation sequence to ensure a condition exists before proceeding. For example, before filling in details in an on-screen computer form, an automation may ensure the form exists. If it does not, the automation may take steps to ensure its existence. These steps may require additional steps that may or may not have been considered by the user developing the automation. As another example, after filling in details in a computer-based form, the form may need to be submitted: the next submission actions may be suggested to the automation developer.

Embodiments may allow a user to build an automation faster.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
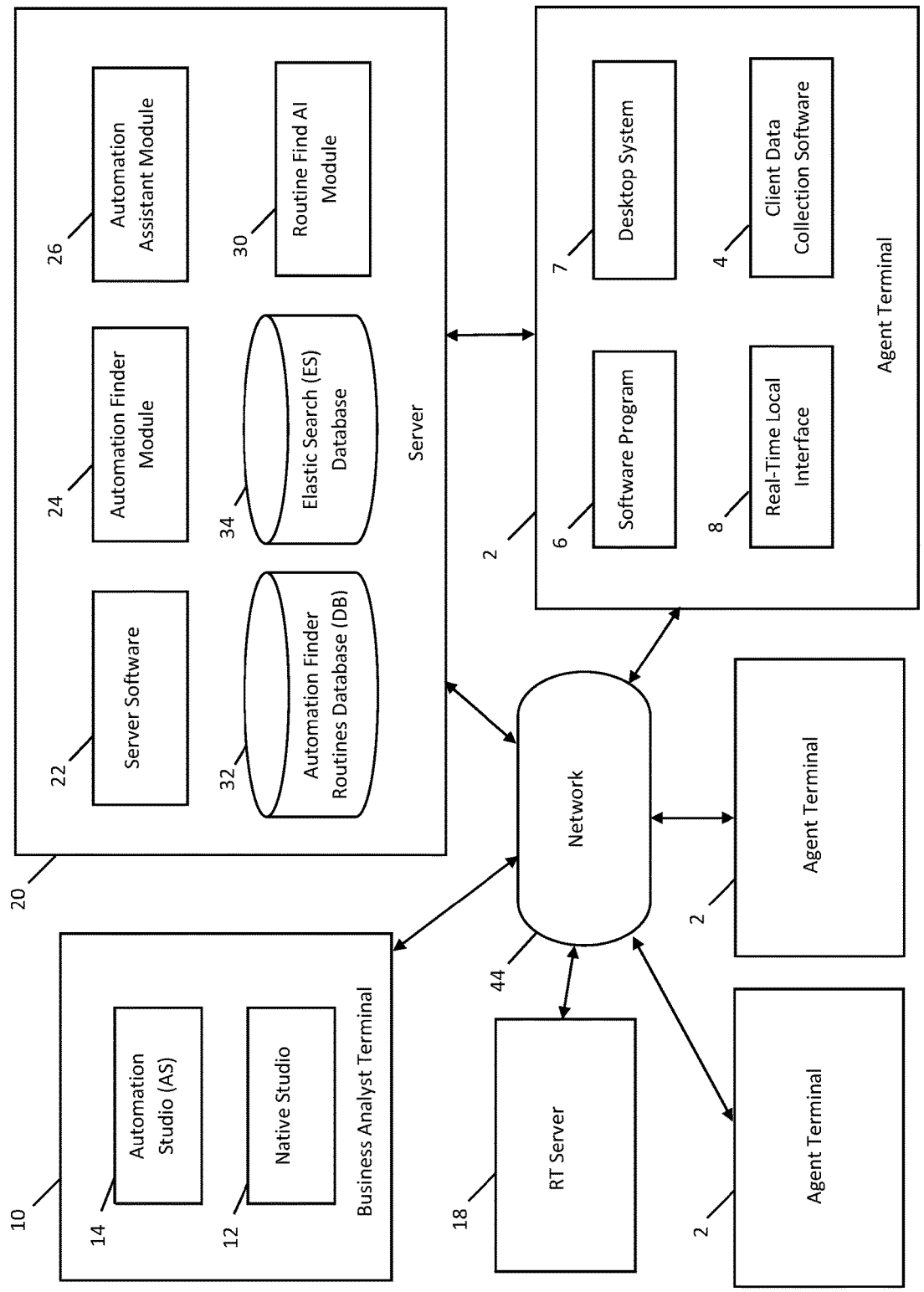
FIG. 1 is a block diagram of a system for providing a next action according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may inject optional suggestions to the user-driven development cycle of designing an automation workflow. Embodiments may "auto-complete" a sequence of user input or actions, or provide a recommended next best or recommended action, for use in an automation sequence being created, for example by comparing an input sequence to a database of known sequences.

Actions may be for example both the actual events of a user providing input to a computer or data descriptions of those events such as user desktop event representations. An example representation of action is shown in Table 1; other representations of actions may be used. In Table 1, the action of a user left-clicking (using a mouse, e.g.) on a certain window is shown. The representations in Table 1 may be in the form of strings.

TABLE 1

```
"type":"Click"
"name":"LeftClick"
  "activeWindow": { "processName":"iexplore",
"title":"RITM0080385 | ServiceNow - Internet Explorer"}
  "actionComponent": { "Name":"All applicationsFavoritesYour history(tab)", "ControlType":"tab item", "Id":"6","ClassName":""}
```

Embodiments may take input from low-level desktop events, as opposed to application-specific information, and thus may be agnostic to the different enterprise or other applications. Some embodiments may be agnostic to the domain (e.g. the platform and specific programs as well as customer type, segment market, etc.) and language used for user interfaces, or other data, and may work with any data, for any specific programs the user interfaces with. Using a data gathering process, low-level user action information items, each describing input or action by a user (e.g. of the computer desktop system), may be received or gathered. Each low-level user action information item may include for example an input type description and screen window information. This process may be used both to develop a database of action sequences.

Low-level user action information or description data (e.g. user action items) may be for example stored and/or transmitted to for example a server or other computer. In one embodiment, data collected may be in the form of Windows Handles and their properties as provided by Windows API (e.g. Win-32). The event logs files describing these data collected desktop events collected may be stored exported using JSON files. Other low-level event or action data may be used. The data may include for example event or action time (e.g. start time, but end time may also be included); user details (e.g. name or ID of the person providing the input or taking the action in conjunction with the computer); action details or description (e.g. mouse-click, text-input, keyboard command, etc.); the details of the window in which the action takes place, such as the window size, window name, etc.; the name of the program executing the window; and text if any that was input or submitted (in text actions). Other or different information may be collected.

Each low-level user action may be described in a database by several fields of the action data such as action time, user details, action details, window name and size, program executing the window, and whether or not text was entered. A generalized name or description may also be created and associated with the action, at various points in the processes described (e.g. for processing a general database of user actions, or for processing a set of actions downloaded from a specific agent computer). A name may have certain specific information such as user ID, timestamp, and other tokens in the data (e.g., names, dates, etc.) removed or replaced with generalized information. Multiple specific instances of similar actions may share the same generalized name or description. Thus actions may be stored and identified by both identifying the specific unique (within the system) instance of the action, and also a generalized name or description.

Generalization of each action is done in order to represent actions not specific to one recorded case instance.

A generalization process may ensure that actions with the same business functionality, or which are functionally equivalent in terms of use within an embodiment of the invention, are be considered as identical even though they may seem slightly different due to different details such as time or user ID. Data such as Win-32 event logs of user's actions may be received or loaded from, e.g. the client data collection software 4—and the various fields may be extracted and stored in a database. An action may include the following example data fields (other or different fields may be used):

Action time;
User details (e.g. user ID, user name, etc.);
Action details: e.g. mouse-click, text-input, keyboard command, etc.;
Window details: window-size, window-name, application process name, etc.; and
Text that was submitted if any.

An action description may summarize the action's information, but may have unnecessary information (e.g. may be noisy) due to various tokens such as names, addresses, IP numbers, etc. For example, in the two following action descriptions, stored e.g. as strings:

"User InputText(Agent1) on Username in MyOrderingSystem-Login—iexplore"

"User InputText(Agent2) on Username in MyOrderingSystem-Login—iexplore"

both represent the same functionality of inserting username (e.g. Agent1, Agent2) in the Username field, but the two descriptions are different as each contains a different name. In order to be able to express the identity of the two different actions, a generalization process may substitute or replace the certain tokens or data items (e.g., the "name" token) with more general or placeholder descriptions, or remove certain tokens. For example, the above two descriptions can be both be generalized as the following single description or text string, which applies to both: "User InputText(NAME) on Username in MyOrderingSystem-Login—iexplore". While in one embodiment only names generalization (e.g. of a name or user ID field) is used, a similar generalization process may be performed for other fields as well. The generalization process may return for example, a database where each entry for a specific unique instance of an actions includes a field including a generalized name for that action that may be shared with other actions. Table 2 below provides another non-limiting example of a description of an action before and after generalization, tokenization, or summarization:

TABLE 2

```
Example of action descriptor before generalization:
  {
    "tenantID": "1",
    "teamName": "QA\\\\GROUPA",
    "clientID": "TP12_d0a433d289d94745952711c4a4f520f0",
    "userName": "User1",
    "type": "Click",
    "name": "RightClick",
    "actionTime": "2020-06-03T20:32:37.0529169+08:00",
    "position": {
        "X": 1102,
        "Y": 231
    },
    "activeWindow": {
        "processName": "EXCEL",
            "title": "New Customer Mailing Addresses
```

TABLE 2-continued

```
06.03.2020 [Protected View] - Excel",
            "height": 856,
            "width": 963,
            "top": 140,
            "left": 956
        },
        "actionComponent": {
            "Identifier": "\"B\" 5",
            "Name": "\"B\" 5",
            "ControlType": "item",
            "Id": "",
            "ClassName": ""
        },
        "ImageGUID": "a7ce187e-eb33-4247-bd25-e7a7aa85f094"
    }
Post-Generalization action descriptor:
    User Click(RightClick) on _alpha-numeric_ item in New Customer
Mailing Addresses _datetime_ - EXCEL
```

An automation sequence created by an analyst may include a series of actions executed by a computer system to substitute for actions taken by a user operating a computer system. For example, the automation sequence may include actions: user left clicks on "ordering system"; user inputs username to username field; user inputs password to password field; user clicks "login". A user may normally perform this sequence of actions, and an automation sequence may have a process on a computer system perform this automation sequence for the user, to automatically and quickly complete the login process for the user.

In one embodiment, action types may include business process actions and robust actions, but other actions may be included. Business process actions may be actions that a user operating a computer may take by providing input to the computer, e.g. typing at a keyboard, clicking a mouse, using a pointing device, etc. Business process actions may follow the process or business flow, for example suggested during automation sequence creations by ranked matching from a routine pool. Robust actions may be an action, that for automation purposes, ensures an error free fast flow (e.g. validating a screen element, introducing time intervals) separate from actions for the business flow: robust actions typically do not mimic or simulate user input to a computer.

Typically automation actions such as business process actions are performed on screen elements (e.g. buttons, windows, dropdown menus, text entry fields) in various applications. During the execution of an automation sequence these elements might not exist for some time, for example while a webpage is in the process of loading or being created. Thus screen elements may not be fully identified or created prior to a certain time. Some screen elements have a set of parameters that change from execution to execution. In some cases, previous user actions that were executed upon a screen element may not be refreshed or effected: for example, when user input inputs a value into an input field, it may take time for this field to reflect the new value.

Figure 2:
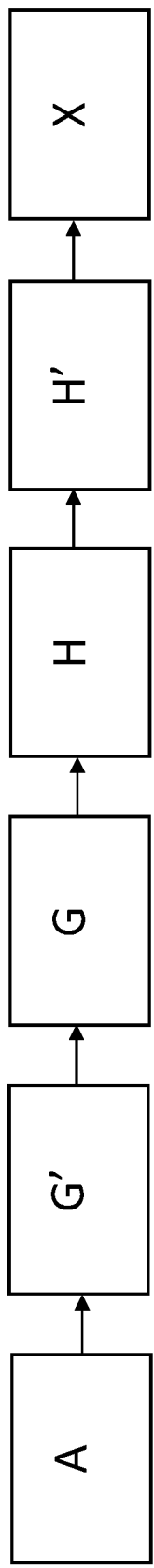
FIG. 2 is an example of a sequence of actions forming a process according to embodiments of the present invention.

FIG. 2 is an example of a sequence of actions forming a process according to embodiments of the present invention. Referring to FIG. 2, actions A, G, H and X are business process actions are performed on screen elements, such as entering text to a field. Robust actions G' and H' may be actions that ensure that actions, G and H respectively, may execute successfully. Action G' may validate that a screen element used in action G exists, and action H' may include a timeout to ensure or increase the likelihood that action H can be successfully performed.

A robust action may be, for an action in the automation sequence which depends on the state of a display screen element, an action that helps to ensure the screen element state allows the action to take place. Robust actions may be or describe actions determining whether or not a computer system can accept a certain input. Robust actions may be for example checking that certain screen elements such as controls or screens exist, which are actions typically not input to a computer by an agent. Robust actions are typically actions that do not correspond to a specific user input such as a mouse click or keyboard input, but rather actions involving checking on-screen or other computer states, and controlling an automation process accordingly. Robust actions may be verification actions generated for, for example the next screen element that is used the business or automation flow. Such an action may include a check or determination whether or not the upcoming business action should be or can yet be executed or may provide additional screen element identification parameters to an existing action in order to increase the likelihood of the business action of succeeding. Screen elements may be identified using their entire hierarchies (e.g. up to the executing process level). The hierarchy may represent the way the captured application is constructed. Example in a Notepad application, a text area may exist in which one can edit text. This control resides inside a Form control, which in turn may resides in a Notepad Window control. The hierarchy of containing controls and their identifiers may be used to access the screen element.

Robust actions may be suggested to be added to a business process to define what happens in a case of failure, e.g. time-out handling. Robust validation action types compared to the software programming mechanism of checking validity of an object after a new operation, such as in Object *obj=new Object( ); If (obj==NULL) . . . .

Prior art user-monitoring applications may be able to collect data only from certain programs or applications; by collecting low-level user actions, embodiments of the present invention may collect all user actions and inputs, regardless of application type, and regardless of whether or not the application is an Internet browser-based application or not. Some embodiments may not require integrations or interfaces to multiple different specific applications. Embodiments may use low-level input data to provide a realistic and detailed understanding of users' actions.

By using low level event data (e.g. describing user actions), embodiments of the present invention may be agnostic to the different enterprise or other applications used and providing input, and may not require integrations to or knowledge of a number of applications. Embodiments of the invention may work without high-level system-specific event logs and may instead use low-level user input data, without being associated (e.g. directly associated via a case ID) to activities or process instances. Prior art systems may use high-level system specific event logs which may include a case identification (ID) which may specifically identify the process or program instance, e.g. a number, and an activity ID (e.g. a unique identifier of each activity in a process) which may specify or identify the task that has been performed by a user or a computer system. In contrast, the low level event data recorded and used in embodiments of the present invention may not be associated with a specific process (e.g. case ID) or activity but rather may be associated only with a window which has a name and with a program or application operating the window (e.g. an internet browser). The title (e.g., the label displayed at the top) of the screen window, and the name of the program executing with which the user is interacting are data may be extracted or obtained and are different from, the specific identification of the process or program instance which in some cases may not be obtained. Event log data such as an activity ID may be data internal to a program, and may not be provided to other programs; in contrast data such as window names may be more accessible and agnostic to the various programs and applications.

Technologies exist to obtain high-level system-specific event logs as input data, such as case ID (e.g. "Process ID"), activity ID and, timestamp to identify user activity or input. A case ID may identify the process instance and an activity ID may specify the task that has been performed as part of the process. Such data is typically provided by the application itself, and may not be provided for all applications, and thus a process using this data works with incomplete data. Data such as an activity ID, user selection and input may be data internal to a program, and may not be provided to other programs. Current processes analyzing user actions or input do not use accessible low-level desktop events as input data; such low-level data may not be associated with a specific process (e.g. case ID) but rather may be associated only with a window and a program operating the window (e.g. an internet browser).

Since the use of low-level input data may make the problem of analyzing user input or actions much harder, prior art processes typically do not use low-level input data. For example in order for such low-level user activity or input data to be performed by a human, the person would need to manually find all the possible sequences of actions in the input data (typically containing millions of actions and as thousands of sequences). A person would have to manually find all the different actions in the data determine the best or recommended action for each sequence. This manual process would require impractical human processing time. Embodiments of the present invention may improve action analysis by allowing for analysis of such data.

An item of information describing or defining a low-level user action may include for example an input type description or desktop event (e.g. the type of action the user performed as input: mouse click, left click, right click, cut, copy, paste, typing text, tab, etc.), a user name, and screen window information such as title or name. (e.g., as computer processes in this context may be displayed as windows, each window may have a title or name which may describe the user-facing application to which the user provides input.) Actions may be stored and identified both identifying the specific unique (within the system) instance of the action, and also a generalized name or description that identifies the action in a way such that actions of similar functionality will have the same generalized name. Both the specific and generalized identification or name may be linked or stored together in the system.

In one embodiment, input may be a log or database of desktop actions, e.g. user input or actions to a GUI for a variety of applications performed by one or more employees. Data describing an action may include for example action data or input type descriptions (e.g. describing whether the input is via mouse or keyboard, or what type or input such as left click, right click, cut, paste, typing text), timestamp, application context, user name, screen window information such as title or name (e.g., as computer processes in this context may be displayed as windows, each window may have a title or name which may describe the user-facing application to which the user provides input), and where possible, field context.

FIG. 1 is a block diagram of a system for providing a next action according to an embodiment of the present invention. While FIG. 1 shows such a system in the context of a contact center, embodiments of the invention may be used in other contexts. A number of human users such as call-center agents may use agent terminals 2 which may be for example personal computers or terminals, including one or more software programs 6 to operate and display a computer desktop system 7 (e.g. displayed as user interfaces such as a GUI). In some embodiments, software programs 6 may display windows, e.g. via desktop system 7, and accept user input (e.g. via desktop system 7) and may interface with server software 22, e.g. receiving input from and sending output to software programs 6. A real-time (RT) local interface 8 executing on terminals 2 (e.g. a NICE Attended Robot provided by NICE, Ltd.) may execute an automation sequence in place of user input or provide or display a recommended next action to a user, according to automations created as described herein. Real-time recommendation local interface 8 may be executed on or by terminals 2. Only one agent terminal shows components, for clarity.

Client data collection software 4, e.g. the NICE RT™ Client software, an Activity Recorder or Action Recorder, may execute on or by terminals 2 and may monitor input to programs 6. For example client data collection software 4 may receive, gather or collect a user's desktop activity or actions, e.g. low-level user action information or descriptions, and send or transmit them to a remote analytics server 20, which may also function as e.g. a NICE RT™ Server. Client data collection software 4 may access or receive information describing user input or actions via for example an API (application programming interface) interface with the operating system and/or specific applications (e.g. the Chrome browser) for the computer or terminal on which it executes.

Analytics server 20 may host for example machine learning components for an automation finder module 24 and an automation assistant module 26. Programs 6 may be executed by or on terminals 2 and server software 22 may be executed by analytics server 20, and software 22 and programs 6 may interact in a client-server manner. Remote analytics server 20 may collect or receive data such as user action information or descriptions and transmit or export them to for example automation finder routines database (DB) 32; after processing the data may be stored in a processed format in an elastic search (ES) DB 34, which may store processed routines and other data in an indexed and searchable format.

One or more networks 44 (e.g. the internet, intranets, etc.) may connect and allow for communication among the components of FIG. 1A.

One or more business analyst terminals 10 may be used by human business analysts, designers, etc. to design automation workflows with the aid of embodiments of the present invention. A business analyst terminal may include modules such as an automation studio (AS) 14 and a native studio 12. AS 14 may be an integrated development environment (e.g. browser based, or operating differently) for developing and may act as a user interface and may interact with native studio 12, which may generate a project or automation, possibly in conjunction with analytics server 20. AS 14 may relays calls to native studio 12, which may relay the calls to an RT Server 18. RT Server 18 may in turn, may relay the calls to an analytics server 20, and may relay information among components.

Automation finder module 24 may for example provide a suggested or projected next business action, and perform other functions as a part of this suggestion. Automation assistant module 26 may provide a next suggested action to a business analyst or workflow designer, via AS 14. AS 14 may pass (e.g. to automation assistant module 26) a business process recording and the most updated version of a developed automation workflow, and automation assistant module 26 may reply with one or more next suggested actions in order to assist business analysts or designers using AS 14. A routine find artificial intelligence ("AI") module or component 30 may independently (e.g. independently from day-to-day agent workforce activity) analyze the data-sets collected from groups of users, stored an automation finder routines database (DB) 32, and may create potential routines for automation and, may store them in analytics elastic search (ES) DB 34.

Terminals 2 and business analyst terminals 10 may be or include computing or telecommunications devices such as personal computers or other desktop computers, conventional telephones, cellular telephones, portable or tablet computers, smart or dumb terminals, etc. Terminals 2, business analyst terminals 10 and server 20, may include some or all of the components such as a processor shown in FIG. 7.

An agent operating an agent terminal 2 typically performs business processes possibly aided by automation. The agent may be asked by a business analyst operating a business analyst terminal 10 to record a specific business process being performed by the agent. The recording may be performed, for example, by client data collection software 4 module which may collect data for other modules discussed herein. The recording may be saved or stored on agent terminal 2 and then be imported by AS 14 to be analyzed by automation assistant module 26. The business analyst may cause to be imported to a business analyst terminal 10 a file containing a recording of raw user-desktop events forming a specific instance of a business process as collected from an agent's computer. The business process data may be sent to analytics server 20 and stored in AF DB 32, and after processing stored in ES DB 34. Automation assistant module 26 may retrieve or search for the most probable routines corresponding to or similar to the recorded business process from routines as stored in ES DB 34. Automation assistant module 26 may predict one or more top suggestions for the business analyst developing the workflow at any stage of the development cycle, and as a response to AS 14 requests.

While various modules are discussed as having certain functionality, in other embodiments functionality may be distributed differently or among other modules.

Figure 3:
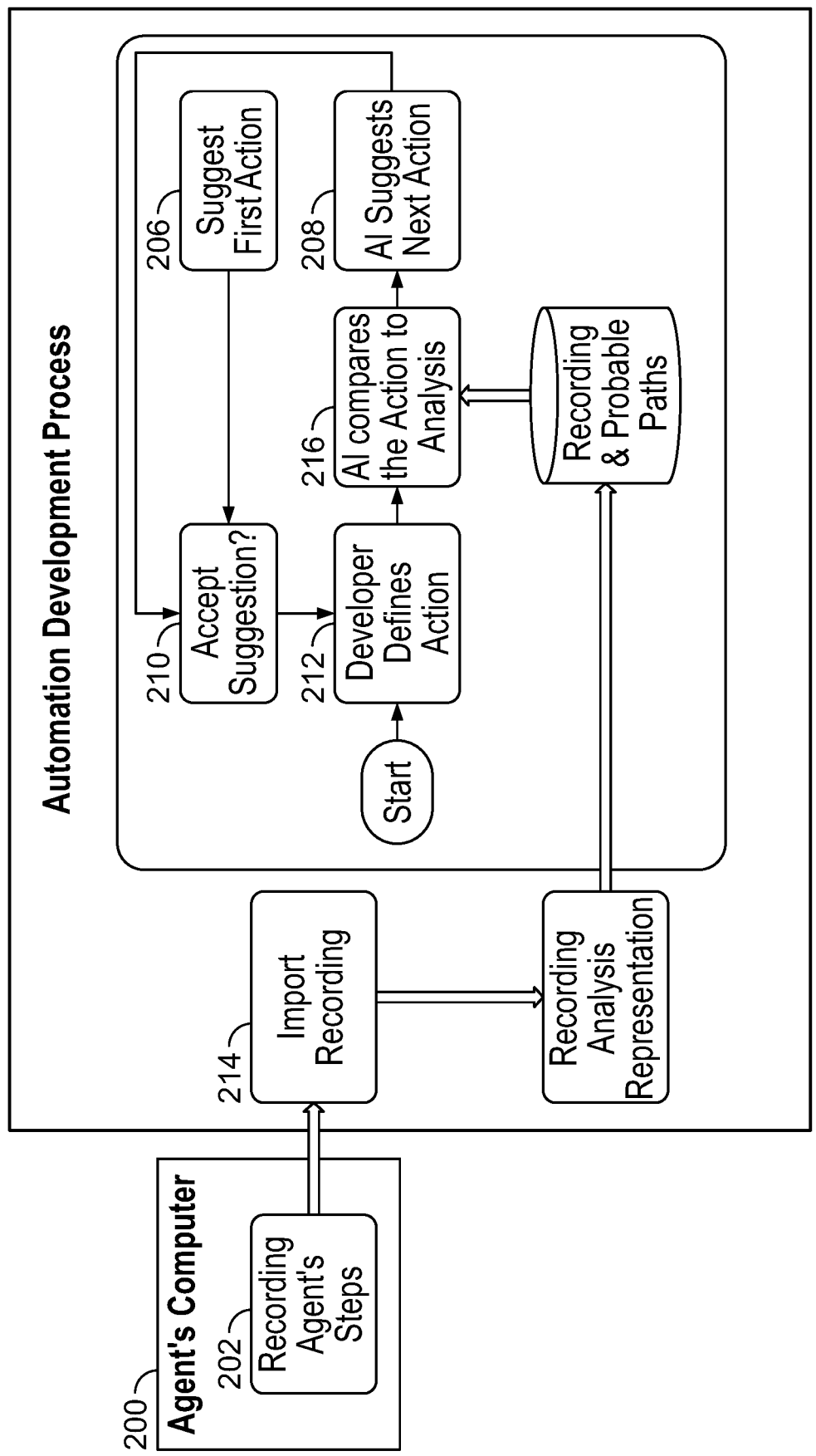
FIG. 3 is a flowchart of a method according to embodiments of the present invention.
Figure 4:
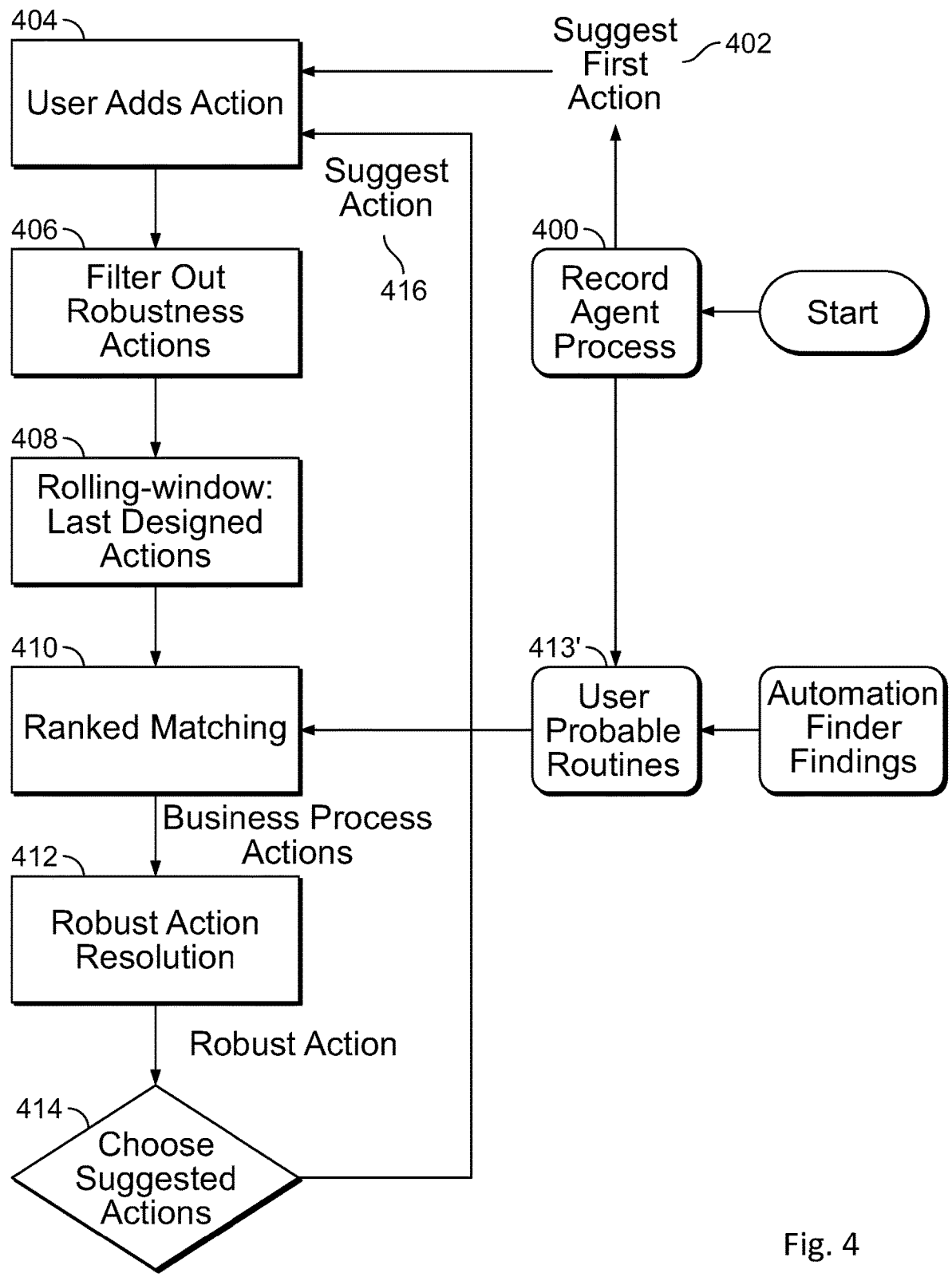
FIG. 4 is a flowchart of a method according to embodiments of the present invention.
Figure 5:
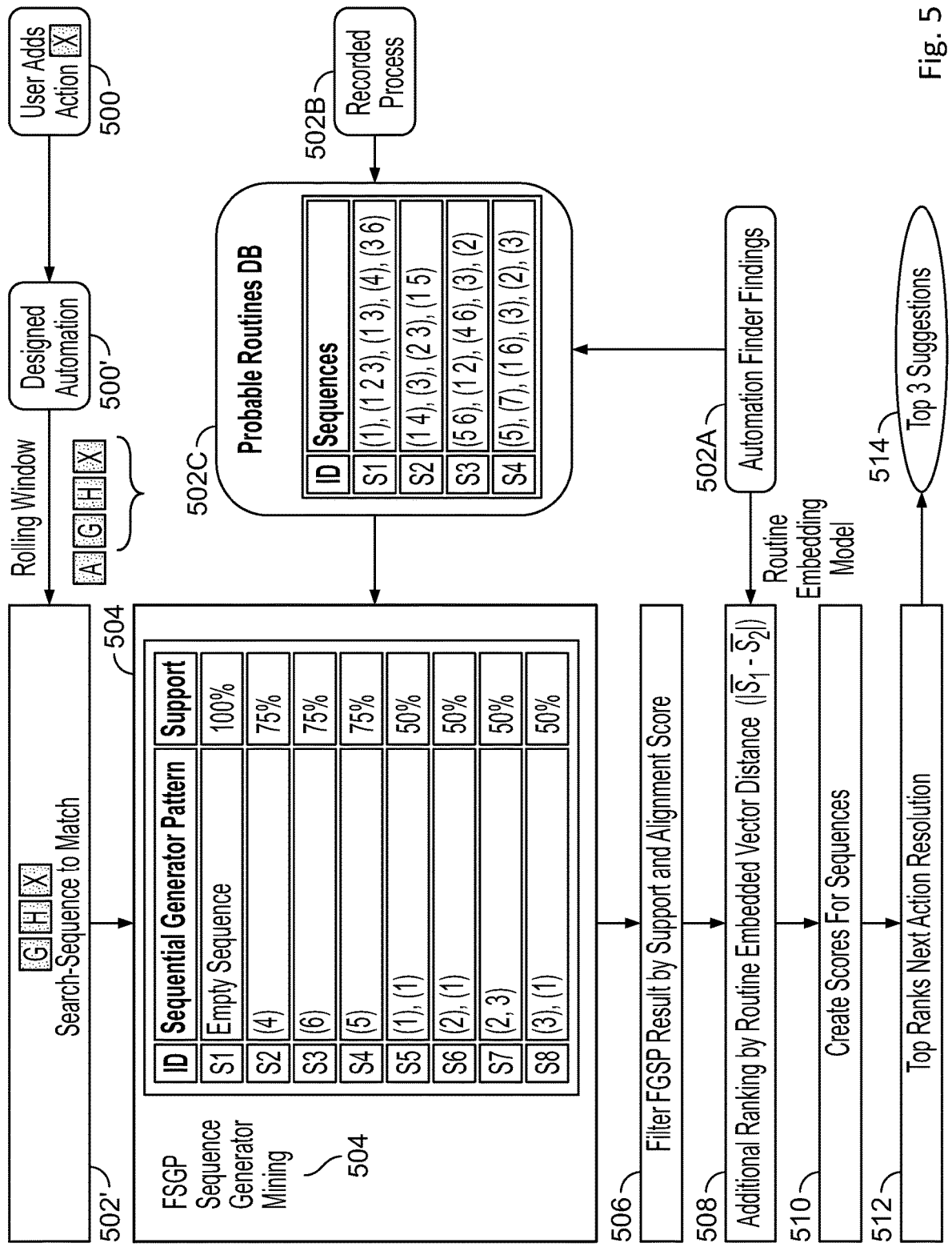
FIG. 5 is a flowchart of a method according to embodiments of the present invention.

FIG. 3 is a flowchart of a method according to embodiments of the present invention. FIG. 3 depicts a flow of data within an automation development cycle as a business analyst progresses through the steps of building an automation workflow or automation sequence which may be executed by a computer system to replace or substitute actions taken by a human user operating a computer system. Typically, operations in FIG. 3 such as processing actions, identifying sequences, suggesting next actions or robust actions, detecting robust actions, etc., are carried out by a computer system such as that shown in FIG. 1. FIGS. 4 and 5 depict series of operation similar to those in FIG. 3, and embodiments may use operations from any of FIGS. 3, 4 and 5 in combination.

Low level action data may be collected from agents e.g. at an agent terminal 200 (e.g. similar to terminal 2 of FIG. 2) and processed. Processing may take place before or after the actions are placed in a database. Many (e.g. tens of thousands) sequences of actions may be collected from many (e.g. tens or thousands) of agents. The low level actions may be processed: for example each action may be processed to be represented as a string or another form; the actions or strings may be generalized; sequences may be identified (e.g. series of actions identified as business processes); and word embedding representations may be generated on by first generating word embedding representations on individual generalized actions. Word embedding may be vector representations (e.g. ordered lists of numbers) which may be created or calculated for each action using, for example a word embedding model such as the Word2Vec model, typically using neural network and AI technology. For example on automation finder training a Word2Vec model, a known word embedding system using a shallow neural network, may be used. The NN model may be trained on the entirety of the collected desktop actions data set as collected from the agents. A vector representation may be created for each recorded sequence by averaging the vector representations of its included actions. In one embodiment the Continuous Bag-of-Words (CBOW) architecture, which predicts the current word based on the context, may be adapted by having actions denote words. CBOW is similar to an autoencoder, encoding each word in a vector, but rather than training against the input words through reconstruction, it is training words against other words that neighbor them in the input corpus.

In operation 202, an agent may cause to be recorded a specific business process during the agent's normal usage of a terminal 2 or 200.

In operation 204, a sequence of actions, e.g. from a specific agent on which a business process may be modeled, may be received and processed to produce an analyzed sequence representation. For example, a business analyst may receive or import a file containing a recording of raw user-desktop events of this business process as collected from an agent terminal 10 in operation 202. The file or recording may be imported to analytics server 20 and processing may take place, and processed actions may be stored for example in ES DB 34. The series of actions collected from the agent may be processed, for example generalizing actions, removing redundant actions, and selecting only certain short sequences from the recording. Each action may be processed to be represented as a string which is a summary of all collected fields for the action describing for example the application, field within application, type of action, and text input by a user associated with the action, with fields generalized. Vector representations may be generated from the processed action sequences, such that each sequence has an associated vector representation.

The received and analyzed sequence representation may be stored. Optionally, a context for the action may be inferred by using a Word2Vec process on neighboring actions as they appear everywhere in the overall dataset. Segmenting may be performed, splitting an input stream of actions into "sentences" of actions, or other actions that are temporally linked so that the sentence describes a particular business functionality.

In one embodiment segmenting may include splitting a series of user actions into a number of user action sentences, each of the user action sentences identifying a functionality executed by the user via a computer. A sequence of user actions in the user action sentences may be determined based on a recurrence for the sequence in the user action sentences, where the sequence includes reoccurring user actions from the user actions recurring in the user action sentences. Other segmenting techniques may be used.

In some embodiments, a pool or database may contain both sequences collected from many agents (e.g. as in operation 200) and sequences or actions taken from one specific agent (e.g. operation 202) and this combined pool may be searched when providing a suggested action.

In operation 206 a suggested first action for the workflow or automation sequence may be calculated or found, based on the analyzed recording from the agent, and presented to the business analyst or developer. In operation 208, a suggested next action may be suggested. The developer may accept or not accept the suggested action, operation 210 and if accepted, add the action to the workflow being designed. The developer may, whether or not related to the suggestion, in operation 212, add, modify or remove an action, to the end of the sequence being created or in the middle of it. Typically, the first action is suggested based on the specific agent recording and not on the general pool of collected actions. In some embodiments, the first meaningful recorded action from the agent is suggested, for example the first recorded action that changes a GUI control state. In the case that prior to the first meaningful action in the agent recording an action was taken to allow a user to have access to the control, such as a selection/open action of the application or page, this prior action may be suggested.

In operation 216, a next action may be found for suggestion. For example, a set of actions from the sequence the business analyst is creating, e.g. the designed workflow or automation sequence, may be defined and sent, for example by AS 14, to automation assistant module 26, requesting suggested actions to display to the designer. The set of actions from the sequence the business analyst is creating, a segment of cut-out actions segment from the workflow, may be termed search-sequence-to-match ("SSTM"). For example, the last several (e.g. 3, 4 or 5) actions, possibly defined by a window, may be selected as the set. In one embodiment, the last action in the sequence may be the last designed or added action by the business analyst, the other actions in the set may be found by counting backwards from this last designed action and including the actions in this window. The last designed action may be in the middle of the sequence in the case that the analyst is adding or editing in the middle of the sequence being designed.

The set of actions from the sequence the business analyst is creating may be used to search for sequences from which to take a next suggested action to produce a search result including a set of sequences. In case the business analyst had navigated to a prior step in the designed workflow to edit or add an action within the workflow being designed, next action suggestions are retrieved according to a "search-sequence-to-match", which may be taken form or cut-out from the segment preceding the action in focus or being performed by the user or agent.

The SSTM sequence may be received and analyzed or processed. Robust actions may be removed or cleaned from the sequence: while an agent typically does not enter such actions, such actions may have been added to the sequence by the business analyst or developer. Robust actions may be automatically recognized for example based on a list of robust actions. In some embodiments, robust actions may be removed prior to an SSTM set of actions being selected.

An embedded representation (e.g. a vector created by an internal representation of a neural network) may be generated for the SSTM.

As part of operation 216, a process may search in a database of action sequences for a set of action sequences corresponding to the received sequence of actions. For example, the received SSTM may be used to search a database or pool for user routines to be assembled into a list. For example a set of probable routines may be combined from the sequences generated from the recorded actions from the specific agent in operation 202 and a database of action sequences such as automation finder routines ES DB 34, and this combined pool may be searched for a set of action sequences corresponding to the SSTM. The pool of sequences searched may including both datasets collected from groups of users stored an automation finder routines ES database 34, and also sequences recorded from a specific agent, e.g. in operation 202.

A database such as automation finder DB 32 may be accessed or retrieved and possibly listed as sequences, e.g. imported into a working database. The working database may also include sequences recorded from a specific agent, e.g. in operation 200, e.g. segmented into sequences. Segmenting may be performed on series of actions before placing the actions in a pool to be searched.

The search for action sequences corresponding to the SSTM may be performed via, for example, two operations. In the first phase or operation a sequential generator pattern mining algorithm generates candidate sequences from the initial sequence pool, via a mining operation, to create a set of best occurrences from the initial pool, typically without regard to the SSTM. This operation may produce a set of sequences which are a good representation of the input pool. For example, frequent sequential patterns generators may be found or discovered (e.g. mined) using a Frequent Sequential Generator Patterns ("FSGP") process from the pool (e.g. the listed sequences) with length equal or longer than a search-sequence-to-match length. FSGP, e.g. sequence mining, may use an AI or machine learning ("ML") process. An FSGP process may determine sequential generator patterns by a method of scanning segments, "sentences", of user actions; based on depth first search framework and safe pruning strategy, given the basis of the inclusion relationship between a sequence and its subsequence. A sequential generator pattern may be a sequential pattern SA such that there does not exists a smaller pattern SB having the same support (e.g. number of occurrences) and such that SB occurs in SA.

FSGP is a known algorithm used for mining sequential generator patterns in sequence databases. An FSGP or other algorithm may for example search for or discover frequent sequential generator patterns that occur in a sequence database. A frequent sequential pattern may be a sequential pattern having a support (e.g. occurrence in a database, possibly divided by the total number of entries in the database) no less than a certain number or parameter (e.g. a minsup parameter).

A sequential generator pattern may be a sequential pattern such that there does not exist a smaller pattern having the same support (e.g. number of occurrences) in the relevant database. An algorithm based on the use of sequential generator patterns may discover repetitive sequences having a minimum sequence support, and that minimum support may be set to determine all occurring sequences within the routines list. An FSGP algorithm may determine sequential patterns in data, such as sequential user actions, not necessarily in direct succession: for example a match may occur between SSTM A-B-C and sequence A-B-D-C, having intermediate additional actions. Typically, the set of sequential generator patterns is generally much smaller than the set of all sequential patterns. Sequential generator patterns are typically minimal patterns. A representation for any pattern that occurs within the probable routines list can be found in the algorithm's output of sequences. Generator patterns generate sequences with a minimal antecedent. Thus a representation for any pattern that occurs within the routines list can be found in the algorithm's output of sequences.

The result from the FSGP may be sequences or candidate sequences, each having a FSGP support score. The FSGP process may generate a support, $S_{FSGP}$ describing the number of sequences where a pattern occurs divided by the total number of sequences. These resultant candidate sequences may be filtered by length, leaving only sequences of length higher or equal to the length of SSTM.

In the second phase or operation, each candidate sequence may be given additional scores by comparing and matching them to the SSTM, using ranking as detailed herein.

In the second phase or operation, the SSTM may be used to search over the resultant candidate sequences, e.g. by aligning the SSTM and measuring a distance to each candidate sequence.

As part of operation 216, the list of results may be ranked or ordered, for example by factors such as the following non-limiting examples:
 a. Alignment score (e.g. a measure of how well the returned sequence aligns with the SSTM);
 b. Embedded routine vector cosine distance (e.g. distance from the SSTM); and/or
 c. FSGP support score, as described elsewhere herein.

The next action may be an action in a sequence in the set of action sequences following, or immediately subsequent to, the last action in the sequence which matches an action from the received SSTM. Each action to be suggested is typically the subsequent new action immediately after the last action matching an action from the SSTM. For example, if the SSTM is (G,H,X) and the suggested sequence is (G,H,K,R), K is the suggested action. The ranking or ordering of that action is equivalent to or set to the ranking or ordering of the sequence from which it comes.

One robust actions, possibly with scores or ranks may be added to the list of suggested actions. In one embodiment, only one robust action is suggested at the time, and it is given the highest possible score in the possible score range with a number added to the score (e.g. +1) to ensure the score is higher than all others. Places for the insertion of robust actions within an automation sequence may be found relative to actions involving "physical objects" in the computing system, such as screen elements or entities that can be used in an automation, which are not "virtual". Examples of "physical objects" include screen elements (e.g. window, button, input area, drop down, etc.), databases, and web services. A process may find a place to add a robust action by detecting two different consecutive actions, e.g. in the sequence the business analyst is creating that relate to the same element (or elements in the same hierarchy). A hierarchy of an object represents its position in the construction of the application in which the object resides. For example, in a Notepad application, a text area in which text is edited includes a Notepad Window control, which includes a Form control, which includes the text area: the hierarchy is the ordered list of objects in which any object is included. Two objects include the same ancestor if that same ancestor is higher up than each object in each object's hierarchy.

A process to search for a robust action may use a rules-based or pattern matching process to find two different consecutive actions in a sequence that relate to the same element (or elements in the same hierarchy), such that for example the element acted on by the second action is not active or existing for some time after the first action. For example, given the following list of actions 1. [input text in input1]->2. [click on button1]->3. [copy text from input2], provided the button1, input1 and input2 all have the same ancestor, a process may suggest (e.g. add to the list of actions to be suggested) between the $2^{nd}$ and $3^{rd}$ actions a robust action which is an action waiting for input2 to be available or for the value of input2 to change after clicking on button1. Examples of Robust Actions include, for example, Check if physical object exists, Check if physical object is editable, Wait for an object to become editable, Wait for specific text to appear in an input control, and Wait for 5 seconds before continuing execution.

A process may find a place in which to insert a robust action by processing similar lists of actions and finding a recurring delay before a specific action. In this case, a preceding action could be considered a robust action if performed on the same element (or another element in the same hierarchy), or a robust action may be inserted between the action and the preceding action.

When a list of actions includes actions performed on elements with different ancestors, robust actions can be suggested to ensure the availability of the different elements, where an action in the automation sequence depends on the state of the elements. For example, given the list of actions: [copy to clipboard: value in cell A1]->[click on window1]->[click on input1]->[paste value in input1]; provided that window1 and input1 have the same ancestor and cell A1 has a different ancestor, a process may suggest a robust action between the $1^{st}$ and $2^{nd}$ actions to ensure that window1 is available and in focus. In this case the robust action may help to ensure the screen element state of window1 is a state that allows the second action to take place successfully or function; the second action depends on the state of screen element window1.

A Robust action may be added to a list of results to be passed to a business analyst as a list of suggested actions. An action, including a robust action, may include a position for the suggested action within the sequence of actions being created by the business analyst.

In operation 208, results may be passed or displayed to the business analyst. For example, the top $f$ ($f$ being an integer, e.g. set by a system designer) scored results may be passed as the response for the suggested action call back to AS 14 for presentation to the business analyst or developer. The next action may be presented to the business analyst, for example as being the last action in an action sequence in the set of action sequences. AS 14 may present or display to the business analyst the top suggestion and may allow the user to view the next X suggestions ordered by score. In some embodiments, if it is determined that robust actions may have benefit at this point in the sequence, they may be suggested first or ranked higher in the returned list of actions than other actions, with a higher or highest score(s). The business analyst may ignore the first suggestions and continue to view the next suggestions.

In operation 220, the business analyst may add an action, possibly the suggested next action, to the automation sequence. A system may receive an action from the business analyst and may add the action to the automation sequence. The business analyst may add an action not on the list of suggested actions; i.e. the analyst may ignore the suggestion. The business analyst may add the action at the end of the sequence or workflow being designed, in the middle, or may edit an already existing action.

Operations 204-216 may be repeated until the business analyst finalizes the automation workflow.

In operations 210 and 212, an end user, such as an agent, may use the created automation sequence, or the created automation sequence may substitute for actions taken by a user operating a computer system, for example by being executed by being input to a computer, e.g. to the relevant GUI elements. For example, the end user, may, instead of manually typing into a computer user interface a sequence of keyboard entries to log in to a system, start an automation sequence, where a computer process executing, for example on the agent's computer, outputs the appropriate sequence of simulated keyboard entries to the relevant program executing on the agent's computer. In another embodiment, based on an automation sequence, an output or recommendation may be provided to a user operating a computer in response to an action by that user. For example, a process such as real-time recommendation local interface 8 may, after a user action or input is received at a user computer (e.g. at program 6), provide a recommended next action, for example may display a recommended action on a user display, e.g. via pop-up window or another process.

FIG. 4 is a flowchart of a method according to embodiments of the present invention. Referring to FIG. 4, in operation 400, a business process including a sequence of actions may be recorded based on a user or agent providing input to a computer. In operation 402, a first action may be suggested to a business analyst designing an automation workflow. In operation 404, the business analyst may choose to add the suggested action to the designed workflow being created by the analyst, or add a different action to the workflow.

In operation 406, robust actions may be filtered out or removed from the sequence of actions being created by the business analyst. In some embodiments this may be performed before the selection in operation of 408 of a set of actions, but the order may be reversed, or the operations may be performed together. In operation 408, a set of actions may be selected or extracted according to a moving or rolling window of X (e.g. five) actions to be used to search to form an SSTM. A moving or rolling window may be defined by X (e.g. a pre-configured integer), actions taken from the designed workflow. The segment may include the action the designer is currently selecting or has most recently selected, and its preceding (X−1) actions. If the designer is selecting or adding a robust action, then the business-process-action which the robust action is associated to may be considered the selected action for the window calculation.

In operation 410, the extracted set of actions may be matched to, or searched in, a database of recorded actions. In operation 412, robust actions may be added to the results from operation 410.

The database of recorded actions (e.g. from many agents) may be for example ES DB 34, and may be populated by an automation finder process. An automation finder process may produce routines, or lists of sequences, each including an ordered list of actions. The routines may be produced by an off-line machine learning (ML) or analysis of recorded user actions, each routine describing a frequent re-occurring task performed by agents on their computers. ES DB 34 may be combined with the actions recorded based on a user providing input to a computer, to produce user routines 413', a combined pool of sequences.

In operation 414, a set of action sequences may be returned from matching or searching over user routines 413'. In operation 416, one or more actions (e.g. the top ranked action) may be suggested to the business analyst, typically the last action in high-ranked action sequences returned in operation 414. In operation 404, the user may add the suggested action, or another action, to the sequence of actions being created by the business analyst.

FIG. 5 is a flowchart of a method according to embodiments of the present invention. Referring to FIG. 5, in operation 500 a business analyst adds an action to an automation sequence or process 500' to create or update the automation process. In operation 502 a set of actions is selected from automation sequence 500', e.g. using a rolling window of the last X actions, to produce SSTM 502'. Additional processing may be performed to produce SSTM 502': for example SSTM 502' may be cleaned from robust actions, where robust actions are removed. Automation finder findings 502A, collected from many agent business processes, may be combined with recorded processes 502B, from one specific agent (possibly segmented), to produce a combined pool of routines 502C. Probable routines 502C may be mined in operation 504, for example using an FSGP process.

In operation 506 the candidate sequences found or mined in operation 504 may be filtered and an alignment score or rating determined. For example the results may be filtered by length such that only sequences that are higher or equal in length to the length of SSTM 502' may be kept, and those shorter may be filtered out or removed. Each remaining candidate sequence (after filtering) may be aligned to SSTM 502' and may receive an alignment score or rating that rates how well each sequence matches the sequence in SSTM 502'. In one embodiment, an alignment score or rating $S_{alg}$ is according to example Eq. 1, where gap penalties is a measure of gaps or spacing between actions in one of the two sequences being compared, the gaps separated by actions not in the other sequence; identities measures the number of actions in order that occur in each sequence; and mismatches measures the number of actions in order in each sequence that are not in the other sequence.

$$S_{alg} = \Sigma(\text{identities}) - \Sigma(\text{mismatches}) - \Sigma(\text{gap penalties}) \quad \text{Eq. 1}$$

In operation 508 an embedding or other score may be calculated for each candidate sequence, e.g. the sequences remaining after operation 506. Each candidate sequence may receive an 'embedded representation' using for example a word2vec model maintained or used by automation finder module 24, which produces a vector representation of actions. The vector representation for a sequence may be calculated by averaging the vector representations of the actions in the sequence, or by another method using the vector representation values of the component actions.

A distance, e.g. a mathematical representation of difference between the entities, may be calculated between SSTM 502' and each of the candidate sequences. For example, the cosine distance between the vector representation of SSTM 502' and that of each candidate sequence may be calculated. In one embodiment, the distance between a candidate sequence, SubSeq, and SSTM 502' may be calculated using the known cosine similarity measure, a measure of similarity between two vectors calculated by determining the angle between the vectors, where the distance may be 1-similarity. Other methods may be used to calculate a distance or score between sequences.

In operation 510 a composite score or rating Score may be created for each candidate sequence, for example the polynomial shown in Eq. 2:

$$\text{Score} = P_1 * S_{alg} + P_2 * |\overline{\text{Seq}_{SSTM}} - \overline{\text{SubSeq}}| + P_3 * S_{FSGP} \quad \text{Eq. 2}$$

Where $P_X$ are constants or weights, weighting the three components of the score, such that the sum of $P_1+P_2+P_3=1$; $S_{alg}$ is an alignment score or rating; $|\overline{\text{Seq}_{SSTM}} - \overline{\text{SubSeq}}|$ represents the distance between the vector representation of 2 sequence items (bar\overline notation for vector: finite tuple); and $S_{FSGP}$ is the FSGP support score for the candidate sequence.

In operation 512, candidate sequences may be selected based on a composite score or rating, and from each of the selected sequences, a suggested or projected next business action may be extracted. The suggested or projected next business action may be extracted or identified as being the subsequent new action occurring in the sequence immediately after the last action matching an action from the SSTM. E.g. if the SSTM is (G,H,X) and the suggested sequence is (G,H,K,R), K is suggested. For example, from the scored candidate sequences having the top f (where f is a configurable integer) scores, the respective projected next business actions, potentially succeeding the SSTM last action, may be extracted together with their score (e.g. the score of the sequence in which the action is found).

In operation 514, the top ranked (e.g. top 3) actions may be selected.

Figure 6:
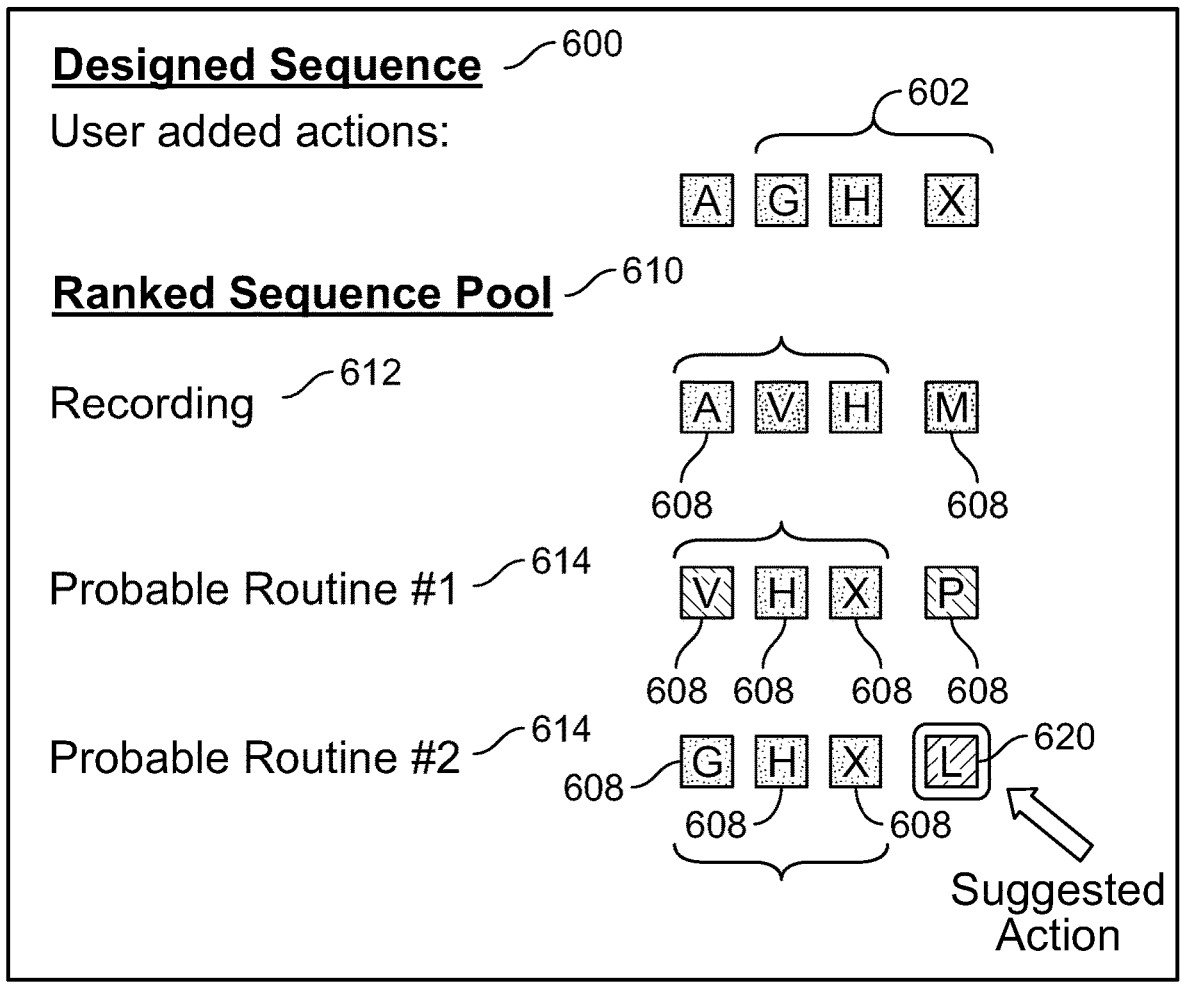
FIG. 6 depicts a set of sequences and a search sequence, according to an embodiment of the present invention.

FIG. 6 depicts a set of sequences and a search sequence, according to an embodiment of the present invention. A designed workflow or automation sequence 600 being created by a business analyst may have an SSTM 602 extracted, and used to search or mine for sequences. A pool 610 may include a recording 612 from one specific agent and routines 614 from routines collected from many agents. Each sequence 612 and 614 may include a series of actions 608. Suggested action 620 may be the next action in a sequence 614 occurring immediately after the actions which themselves match the SSTM, the sequence including action 620 being rated the highest.

Figure 7:
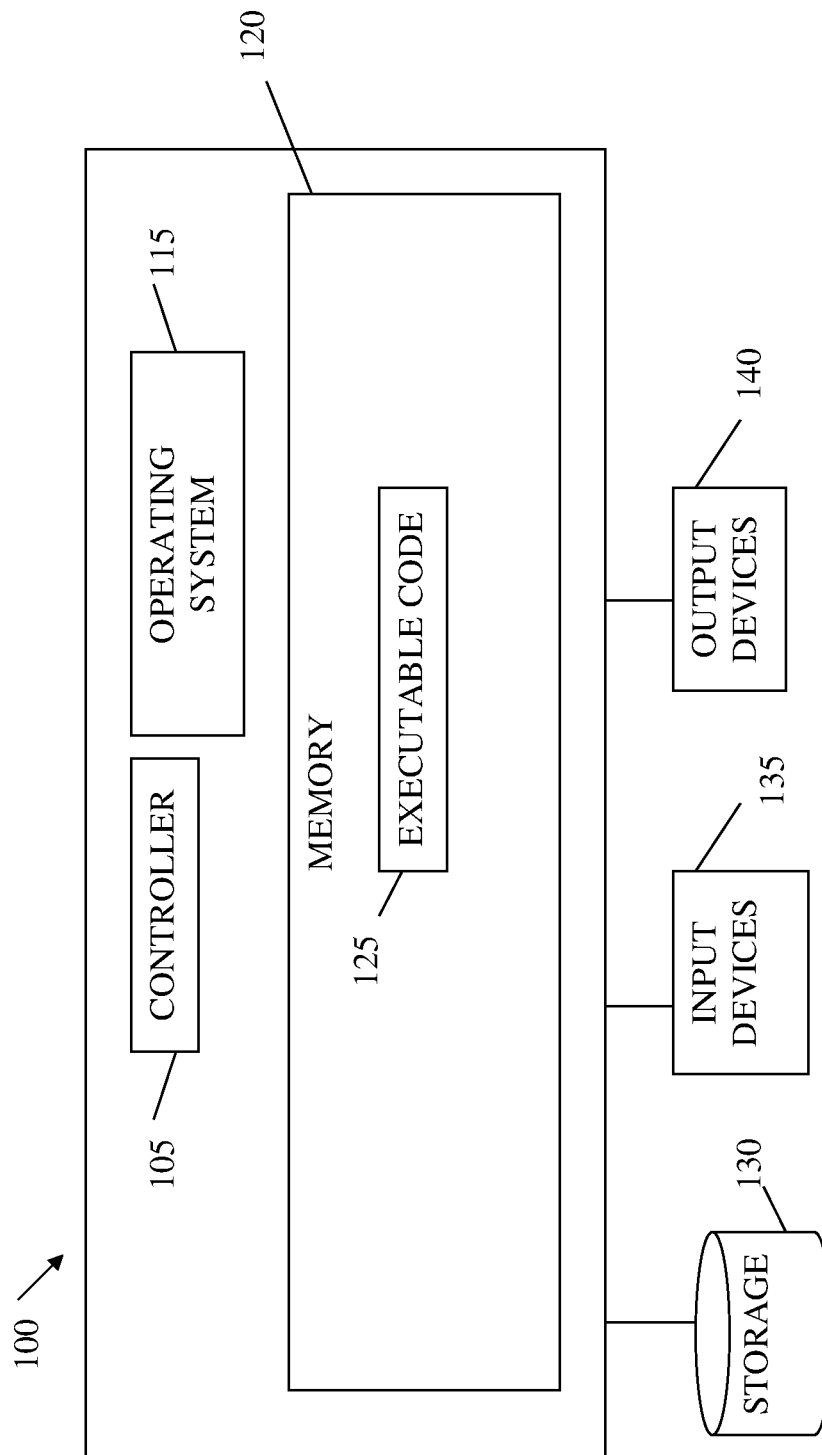
FIG. 7 is a high-level block diagram of an exemplary computing device which may be used with embodiments of the present invention.

FIG. 7 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment such as terminals 2, analytics server 20, business analyst terminals 10 and other modules discussed herein may be or include, or may be executed by, a computing device such as included in FIG. 7, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as low-level action data, output data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3-5, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 7 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the invention may improve the technologies of computer automation, big data analysis, and computer use and automation analysis by using specific algorithms to analyze large pools of data, a task which is impossible, in a practical sense, for a person to carry out.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for determining a next action in an automation sequence of actions, the method comprising, in a computer processor:
    creating a bot by:
    receiving a sequence of actions, each action representing computer input;
    using the computer processor, filtering robust actions to remove the robust actions from the received sequence of actions, wherein a robust action does not correspond to user input and checks a computer state, the robust action causing an automation sequence to ensure a condition exists before proceeding;
    using the computer processor, searching in a database of action sequences, each action in an action sequence from the database of action sequences representing computer input, for a set of action sequences from the database of action sequences corresponding to the filtered sequence of actions;
    creating an automation sequence to be output by the bot to the computer, the automation sequence comprising actions executed by a computer system to substitute for actions taken by a user operating the computer system;
    using the computer processor, presenting the next action as being an action in a sequence in the set of action sequences immediately subsequent to a last action in the sequence matching any action from the received sequence of actions; and
    adding one of the next action or an action other than the next action to the automation sequence.

2. The method of claim 1, wherein the robust action is, for an action in the automation sequence which depends on a state of a display screen element, an action helping to ensure the display screen element state allows the action in the automation sequence to take place.

3. The method of claim 1, comprising generalizing the actions in the database of action sequences by replacing at least one specific item of information in an action in the received sequence of actions with a general token.

4. The method of claim 1 comprising, prior to searching, performing a sequential generator pattern mining algorithm on the database of action sequences.

5. The method of claim 1 comprising executing the created automation sequence of actions by inputting the created automation sequence of actions to a computer.

6. The method of claim 1 wherein presenting the next action comprises presenting a plurality of actions ranked by one or more of: an alignment score; an embedded routine vector cosine distance; and a support score.

7. The method of claim 1 wherein searching in the database of action sequences comprises using a Frequent Sequential Generator Patterns process.

8. The method of claim 1 wherein searching in the database of action sequences comprises filtering search results by length and/or an alignment score.

9. The method of claim 1 wherein searching in the database of action sequences comprises creating a score for search result based on an embedding for the result.

10. A system for determining a next action in an automation sequence of actions, the system comprising:
    a memory; and
    a processor configured to create a bot by:
    receiving a sequence of actions, each action representing computer input;
    filtering robust actions to remove the robust actions from the received sequence of actions, wherein a robust action does not correspond to user input and checks a computer state, the robust action causing an automation sequence to ensure a condition exists before proceeding;
    searching in a database of action sequences, each action in an action sequence from the database of action sequences representing computer input, for a set of action sequences from the database of action sequences corresponding to the filtered sequence of actions;
    creating an automation sequence to be output by the bot to the computer, the automation sequence comprising actions executed by a computer system to substitute for actions taken by a user operating the computer system;
    presenting the next action as being an action in a sequence in the set of action sequences immediately subsequent to a last action in the sequence matching an action from the received sequence of actions; and
    adding one of the next action or an action other than the next action to the automation sequence.

11. The system of claim 10, wherein the robust action is, for an action in the automation sequence which depends on a state of a display screen element, an action helping to ensure the display screen element state allows the action in the automation sequence to take place.

12. The system of claim 10, wherein the processor is configured to generalize the actions in the database of action sequences by replacing at least one specific item of information in an action in the received sequence of actions with a general token.

13. The system of claim 10 wherein the processor is configured to, prior to searching, perform a sequential generator pattern mining algorithm on the database of action sequences.

14. The system of claim 10 wherein the processor is configured to execute the created automation sequence of actions by inputting the created automation sequence of actions to a computer.

15. A method for determining a next action in an automation sequence, the method comprising:
creating a bot by:
receiving a search sequence, each action representing computer input;
using a computer processor, filtering robust actions to remove the actions from the received search sequence, wherein a robust action does not correspond to user input and checks a computer state, the robust action causing an automation sequence to ensure a condition exists before proceeding;
using the computer processor, searching in a database of action sequences, action sequences using the filtered search sequence to produce a search result, each action in an action sequence from the database of action sequences representing computer input;
using the computer processor, creating an automation sequence to be output by the bot to the computer, the automation sequence comprising actions executed by a computer system to substitute for actions taken by a user operating the computer system;
presenting a next action as being an action in the search result following a last action in a sequence matching an action from the search sequence; and
adding one of the next action or an action other than the next action to the automation sequence.

16. The method of claim 15, wherein the robust action being, for an action in the automation sequence which depends on a state of a display screen element, an action helping to ensure the display screen element state allows the action in the automation sequence to take place.

17. The method of claim 15 comprising, prior to searching, performing a sequential generator pattern mining algorithm on the database of action sequences.

* * * * *